Patented Apr. 29, 1947

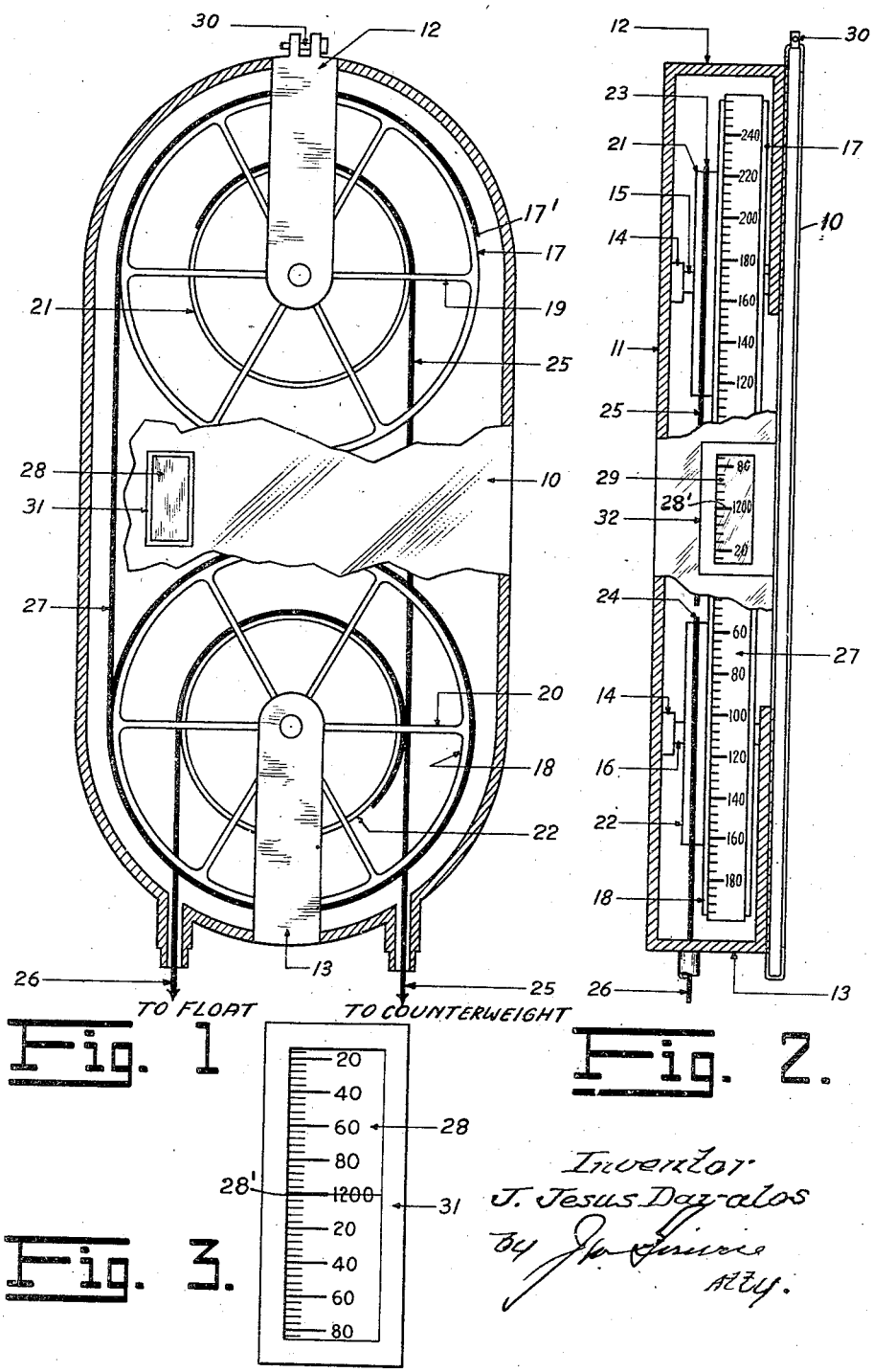

2,419,709

UNITED STATES PATENT OFFICE 2,419,709

LIQUID LEVEL MEASURING DEVICE

Jose Jesús Dávalos, Guadalajara, Mexico

Application July 18, 1944, Serial No. 545,466
In Mexico August 20, 1943

1 Claim. (Cl. 73—321)

This invention relates to a liquid level measuring device, and particularly to the apparatus mentioned in my former Mexican Patent No. 40,454, using an indicating dial disposed in a liquid. This dial supplies a scale which has been previously calculated in accordance with the movements of a needle operated by cords which at one end are tied to a float disposed in the liquid container, while the other end is tied to a counterweight, the cord thus placed under tension moving a pulley at the center of which the said needle is set. I have noted that the measuring capacity of the above described indication is limited, and it is necessary to use many measuring devices in order to fill the requirements of certain measuring limits, for which reason the apparatus of this invention encounters the difficulty of higher production costs, it being impossible to secure devices which will be adapted to measure both small and excessively great amounts. In view of the above I have furnished this novel invention, which facilitates the construction of measuring devices in large numbers, to be generally applied to the use for which they are made.

Another object of my novel invention is that the reading may be effected from the front or from a side thereof.

Another object of the invention is to provide a reading arrangement where the needle is fixed while the scale is moving.

These and other objects, advantages and improvements will be easily appreciated by those who are expert in the art from the following description, which is accompanied by drawings, the same reference numbers being used to designate similar parts throughout the different figures shown.

In the drawings:

Fig. 1 shows a front view of the measuring device, with portions broken away in order to show the inside mechanism.

Fig. 2 shows a side view of the same device, with portions broken away, and

Fig. 3 shows, on a larger scale, the window for the reading being located at the front, as shown in Fig. 1, or on a side, as shown in Fig. 2, or at both mentioned places.

Referring specifically to the drawing, the invention provides a casing 10 mounted on the supporting bracket 11, bent in U shape at its ends, as shown at points 12 and 13, supplying bearings 14 for shafts 15 and 16, each of which is provided with wheels 17 and 18, to the spokes of which, 19 and 20, are secured pulleys 21 and 22 provided with grooves 23 and 24 to receive cord or cable 25 holding the counterweight (not shown), and cable 26 for the float (not shown), which are maintained within the receptacle containing such liquids as are to be measured.

A scale carrying ribbon, termed indicating ribbon, is secured at 17' to wheel 17, passed over the upper portion of wheel 17 and down free of and beyond wheel 17, and continued in the same direction to and around the full periphery of wheel 18, the terminal of ribbon 17 being secured to the periphery of wheel 18 at a point coincident with the initial contact of ribbon 17 with wheel 18.

A second ribbon, termed weight ribbon 25, is terminally secured to pulley 21 at a point diametrically opposite the securing of ribbon to wheel 17, passed over the top of pulley 21 and depends in the casing 10 and through a guide opening in the bottom of the casing, and is terminally provided with a weight. A ribbon 26, termed a float weight, is secured to pulley 22 at one side of its periphery, carried over the top of pulley 22 and depends in the casing and through a guide opening in the bottom of the casing, and carries a float.

A stud 30 supports casing 10 in a firm position; and bevels 31 and 32 are provided at the edges of windows 28 and 29. A pointer or indicating mark 28', Figure 3, is arranged on the windows as the reading line for the scale.

A set of prismatic mirrors (not shown) will be used to enable readings to be taken from the forward part of the window 28, the location of which is conventional.

A window 29 is secured in casing 10 to overlie the face of indicating ribbon 17, which window and ribbon face are marked with appropriate scale markings. The ribbon markings are visible through the window and indicate the appropriate reading in the movement of such ribbon.

While in practice some slight changes and modifications will doubtless occur within the true spirit and scope of my invention, I want it understood that I do not intend to limit my invention exclusively to the illustrations and description so far made, but that the limitations will fall within the following claim.

Having thus described the invention what I consider as new and desire to secure by Letters Patent is:

A liquid level measuring device, including a casing, a shaft transverse the casing near each end thereof, an upper wheel on one shaft, a lower wheel on the other shaft, a pulley on each shaft fixed to the adjacent wheel, an indicating ribbon terminally fixed to the periphery of the upper wheel and passed over the top of such wheel and depending in spaced parallel relation to one wall of the casing, said ribbon passing over and around the lower wheel and terminally secured to the lower wheel, a scale on the face of the indicating ribbon, a window in the casing to overlie and permit reading of the ribbon scale, a weight ribbon terminally connected to the upper pulley and depending through a guide opening in the lower end of the casing, a weight connected thereto beyond the casing, a float ribbon terminally connected to the lower pulley and passed over the same, said float ribbon depending through a guide opening in the casing, and a float carried by the end of the float ribbon beyond the casing.

J. JESÚS DÁVALOS.

REFERENCES CITED

The following references are of record in the file of this patent:

UNITED STATES PATENTS

| Number | Name | Date |
|---|---|---|
| 1,208,026 | Smith | Dec. 12, 1916 |
| 1,787,298 | Ziola | Dec. 30, 1930 |
| 1,734,068 | Ziola | Nov. 5, 1929 |
| 2,344,825 | Lear | Mar. 21, 1944 |
| 2,078,637 | Naden | Apr. 27, 1937 |
| 1,860,678 | Langley | May 31, 1932 |
| 1,257,693 | Furman | Feb. 26, 1918 |
| 2,348,362 | Rudolf | May 9, 1944 |